United States Patent
Iuchi et al.

(10) Patent No.: US 8,735,456 B2
(45) Date of Patent: May 27, 2014

(54) PROCESS FOR PRODUCING THERMOPLASTIC RESIN COMPOSITION, AND THERMOPLASTIC RESIN COMPOSITION PRODUCED BY THE SAME

(75) Inventors: Kenichiro Iuchi, Yokohama (JP); Daishi Saiki, Kawasaki (JP); Isao Hagiwara, Yokohama (JP); Shunichiro Nishida, Tokyo (JP); Tomomi Tsutsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 614 days.

(21) Appl. No.: 12/266,946

(22) Filed: Nov. 7, 2008

(65) Prior Publication Data
US 2009/0131596 A1   May 21, 2009

(30) Foreign Application Priority Data

Nov. 9, 2007   (JP) .................................. 2007-292192
Oct. 29, 2008   (JP) .................................. 2008-278428

(51) Int. Cl.
   *B29B 17/00* (2006.01)
   *B29B 17/04* (2006.01)
   *C08J 5/00* (2006.01)
   *C08L 55/02* (2006.01)
   *C08L 69/00* (2006.01)
   *C08J 11/06* (2006.01)

(52) U.S. Cl.
   USPC ............................... 521/41; 521/45.5; 525/67

(58) Field of Classification Search
   USPC ...................... 521/40, 40.5, 41, 45.5; 525/67
   See application file for complete search history.

(56) References Cited

U.S. PATENT DOCUMENTS

| 5,543,448 A * | 8/1996 | Laughner ..................... 524/109 |
| 2003/0065092 A1 | 4/2003 | Takagi |
| 2009/0069453 A1 * | 3/2009 | Hasegawa et al. .......... 521/40.5 |

FOREIGN PATENT DOCUMENTS

| CN | 1380895 A | 11/2002 |
| JP | 2000-136393 A | 5/2000 |
| JP | 2003-096288 | 4/2003 |
| JP | 2004-352762 A | 12/2004 |
| JP | 2005-289047 | 10/2005 |
| WO | 01/72900 A | 10/2001 |

* cited by examiner

*Primary Examiner* — Jeffrey Mullis
(74) *Attorney, Agent, or Firm* — Canon U.S.A., Inc., IP Division

(57) ABSTRACT

A process for producing a thermoplastic resin composition includes kneading a mixture obtained by combining a rubber component with a ground product, the ground product being formed by grinding a thermoplastic resin molded article having an alloy resin of a polycarbonate and an ABS, and then molding the mixture after kneading. The mixture has 0.5 wt % or more and 1.5 wt % or less of the rubber component based on 100 wt % of the mixture.

7 Claims, No Drawings

PROCESS FOR PRODUCING THERMOPLASTIC RESIN COMPOSITION, AND THERMOPLASTIC RESIN COMPOSITION PRODUCED BY THE SAME

BACKGROUND OF THE INVENTION

1. Field of the Invention

The present invention generally relates to a process for producing a thermoplastic resin composition, and a thermoplastic resin composition produced thereby. More specifically, this invention relates to technologies for the recycling of degraded thermoplastic resin comprising an alloy of a polycarbonate resin and an ABS resin.

2. Description of the Related Art

Recently, the trend towards recycling petrochemical products, and especially the recycling of plastics, has become apparent with the increase in concern about protection of the environment. Japanese Patent No. 3095739 describes a technique for recycling used plastics that is a thermal recovery method, which utilizes thermal energy generated from combustion.

Material recycling, which re-uses plastic as a raw starting material, is also known. However, material recycling may have the following concerns. Specifically, resin compositions can often degrade due to hydrolysis and exposure to UV light, so that properties such as their composition strength and flame retardancy will usually deteriorate. Therefore, even if a molded article collected from the marketplace is ground and then directly re-molded, it can often be difficult to obtain a molded article having strength and flame retardancy that is equivalent to that of a molded article obtained from a virgin resin. Thus, it can be difficult to use a re-molded article as a part of a product in the same field as that in which the molded article was used before collection. As a result, cascade recycling, in which such collected molded articles are used as a part of a product in a different field, has predominated.

Recently, there has been a trend to attempt to obtain recycled resin compositions having properties that are close to those of a virgin plastic of the same grade, by reproducing the properties inherent in the resin composition before recycling to form the post-recycled resin composition.

Japanese Patent Application Laid-Open No. 2004-352762 proposes a method for obtaining physical properties equivalent to those of a particular virgin plastic of the same grade. In this method, 3 to 10 wt % of a core-shell type graft rubbery elastomer and/or 0 to 2 wt % of fluoroolefin resin is/are incorporated into a recycled thermoplastic resin in which a polycarbonate resin and a styrenic resin, such as a high-impact polystyrene resin (HIPS), are mixed, at least one of which is collected plastic.

Alloy resins of polycarbonate and ABS (a copolymer of acrylonitrile, butadiene, and styrene) often have excellent properties in terms of strength and flame retardancy, and accordingly such plastics are used in a wide range of products, such as home appliances, information devices, communication devices and automobiles.

However, the product that is formed by grinding an alloy resin of polycarbonate and ABS still cannot be used to obtain a molded article having an impact strength and flame retardancy that are equivalent to that of the virgin resin after recycling.

Therefore, there remains a need for the establishment of a process for material recycling of a degraded thermoplastic resin containing an alloy resin of polycarbonate and ABS.

SUMMARY OF THE INVENTION

In one embodiment according to the present invention, a process is provided for producing a thermoplastic resin composition. The process includes kneading a mixture obtained by combining a rubber component with a ground product, the ground product being formed by grinding a thermoplastic resin molded article having an alloy resin of a polycarbonate and an ABS. The mixture is molded after kneading. The mixture includes 0.5 wt % or more and 1.5 wt % or less of the rubber component based on 100 wt % of the mixture.

Further features of the present invention will become apparent from the following description of exemplary embodiments.

DETAILED DESCRIPTION OF THE EMBODIMENTS

In one embodiment, the materials used in aspects of the present invention may comprise at least one of a degraded thermoplastic resin and a rubber component.

In one version, the degraded thermoplastic resin is a thermoplastic resin comprising an alloy resin of polycarbonate and ABS. ABS resin is a resin comprising a copolymer of acrylonitrile, butadiene, and styrene. "Degraded thermoplastic resin" as used herein refers to a thermoplastic resin of which the strength and flame retardancy have deteriorated due to temporal changes, changes under the conditions of light or heat, and so on, as compared to the virgin resin (i.e., pre-degradation). For example, the term "degraded thermoplastic resin" can refer to a resin for which the Charpy impact strength, used for the below-described impact strength evaluation, is half or even less than half of that of the virgin resin, and for which a combustion time in a flame retardancy test is increased, or drips are generated. Examples of molded articles formed of resin that has become degraded can include, but are not limited to, housings and mechanism parts of the constituent pieces of home appliances, information devices, communication devices, automobiles and the like. In one embodiment of the invention, such molded articles may be collected from the marketplace after about five to seven years of use. The housings and mechanism parts may be ground and classified, and the resultant ground product may be utilized. In one version, the product may be ground and classified to provide good dispersion of the rubber component and ease of supply to a molding or kneading machine. For example, the classified ground product may have an average particle size of 10 mm or less. As another example, a resin material may be ground within the range of 3 mm or more and 8 mm or less to form the ground product.

In one aspect of the invention, in degraded resins, the content of phenols as measured through analysis of a Soxhlet extract using acetone may be larger by 5% or more than the content in a virgin resin of the same grade. Further, the term "phenols" as used herein is a collective term given to aromatic hydroxy compounds having a phenolic structure. This term includes a low molecular weight component of polycarbonate, a component derived from polycarbonate, such as a component typified by unreacted Bisphenol A, a component that has decomposed due to thermal history during molding, and a component derived from a phosphate contained as a flame retardant.

The content of phenols generally increases in the course of generation of thermal history during molding of a part, as well as in the course of usage in the marketplace as a part. For example, the content of phenols produced during molding may be 5%. As another example, for a part that is used for 5 years in a normal environment, the increase in content of phenols may be about 2%, while for a part used for 7 years, the increase in content of phenols may be about 4%.

Accordingly, in one aspect, the content of phenols in a resin may increase by 5% or more compared with a virgin resin prior to molding. Examples of ground products that may be suitable for a reuse process according to an embodiment of the present invention may be collected resins having an increase in content of phenols of 7% or more and 11% or less. Further, while it was described above that the content of phenols may also increase with an increase in the number of years of use, it may also be the case that almost no change occurs once a certain period is elapsed. It is believed that if the content of phenols increases, heat resistance and moisture resistance may degrade, and thus an increase in content of phenols is thought to be one of the causes of degradation of a virgin resin.

In one embodiment, one of the other materials used in the present invention is a rubber component. "Rubber component" as used refers to a material that includes a rubber, which material may also include an organic compound other than the rubber. In one version, compatibility with the resin may be obtained by providing a material having a core-shell structure. The rubber component can include at least one rubber selected from the group consisting of butadiene rubber, styrene butadiene rubber, acrylonitrile butadiene rubber and silicone rubber. Specific examples thereof may include, but are not limited to, butadiene rubber, styrene butadiene rubber, acrylonitrile butadiene rubber or a graft copolymer of silicone rubber with styrene or methyl methacrylate. The rubber content in the graft copolymer may be 40 wt % or more and 80 wt % or less, such as 45 wt % or more and 75 wt % or less.

Examples of such rubber-containing graft copolymers may include the "METABLEN C-SERIES" (product name) and "METABLEN S-SERIES" (product name), available from Mitsubishi Rayon Co., Ltd.

In one embodiment of the present invention, a molded article is reproduced and/or recycled by adding the above-described rubber component to the above-described degraded thermoplastic resin comprising an alloy resin of polycarbonate and ABS. In one version, for example, the rubber component may be combined with the degraded thermoplastic resin to form a mixture comprising, for example, 0.5% or more and 1.5% or less by weight of the rubber component based on 100 wt % of the mixture. As a result, it may be possible to obtain an article having a strength and flame retardancy that are equivalent to those obtained in the case where a molded article is formed using a virgin resin.

Further Addition of a Virgin Resin and a Fluoroolefin Component

In one embodiment, according to the application for the resin, at least one of a virgin thermoplastic resin of the same grade but having a different color than the ground product, and a fluoroolefin component, may also be added to the mixture containing the degraded thermoplastic resin and rubber component.

For example, in one version, a virgin thermoplastic resin of the same grade but having a different color may be blended into the classified ground product. In this case, the blending proportion of the virgin thermoplastic resin may be 0.5 wt % or more and 1.0 wt % or less based on the total amount of 100 wt %. In one version, the reason for blending of a virgin thermoplastic resin of the same grade but having a different color than that of the ground product may be to be able to relatively simply visually distinguish a non-treated ground product from a resin whose physical properties have been recovered. In order to relatively simply distinguish them visually, the addition of 0.5 wt % or more of the virgin resin may, in some versions, be the minimum amount that allows the difference in colors to be confirmed visually. In one version, to increase the utilization rate of the ground product, the utilization rate of the virgin resin may be relatively low, and even as low as possible. For example, the virgin resin may be used in amount of 1.0 wt % or less.

In one embodiment, a fluoroolefin component may be blended into the classified ground product material, for example to reduce the incidence of drip caused by the thermoplastic resin composition. In one version, the blending proportion of the fluoroolefin component may be 0 wt % or more and to 0.5 wt % or less based on the total mixture amount of 100 wt %. Setting a blending proportion of the fluoroolefin component at 0.5 wt % or less may also comply with the Blue Angel requirements (i.e., "Der Blaue Engel", a label awarded by the Environmental Label Jury (Jury Umweltzeichen), in cooperation with other participating institutions, to identify environmentally friendly products).

Examples of the fluoroolefin component may include, but are not limited to, polytetrafluoroethylene-containing materials. The polytetrafluorethylene-containing materials may be, for example, those obtained by blending a polytetrafluoroethylene dispersion having a particle size of 0.05 µm or more and 1.0 µm or less, with a dispersion of polymer particles, subjecting the resultant dispersion to emulsion polymerization with a monomer having an ethylenically unsaturated bond, and then coagulating or spray drying to form a powder.

In one version, the polytetrafluoroethylene content in the fluoroolefin component may be selected to provide compatibility with the resin. For example, the polytetrafluoroethylene content in the fluoroolefin component may be 15 wt % or more and 55 wt % or less, such as 18 wt % or more and 50 wt % or less.

Examples of such a fluoroolefin component include the "METABLEN A-SERIES" (product name) available from Mitsubishi Rayon Co., Ltd.

In one embodiment, the molded article may be obtained by blending and melt-kneading the above-described rubber component, and the virgin resin having a different color and/or the fluoroolefin component, with the ground product of a thermoplastic resin comprising an alloy resin of a polycarbonate resin and an ABS resin, and subjecting the resultant material to a kneading step to mold the material.

In one version, the method of molding the material can comprise at least one of injection molding, extrusion molding, sandwich molding, two-color molding, core back molding, and the like. The present invention is furthermore not limited to these particular molding methods, and molding methods other than those described herein may also be used.

EXAMPLES

Used as a component A was a material obtained as follows. As the degraded alloy resin of polycarbonate and ABS (hereinafter, "PC/ABS resin"), a PC/ABS resin that had been used for the exterior of an office machine collected from the marketplace after about five to seven years of use, was ground, and then subjected to a vibrating sieve to obtain a material having a particle size of 3 mm or more and 8 mm or less.

Component A and a virgin resin of the same grade as that of component A were prepared. The content of phenols in the resin was measured, and the results are shown in Table 1.

The measurement was carried out in the following manner.

A precisely-weighed sample of about 5 g was subjected to Soxhlet extraction for 8 hours using acetone. The extract was concentrated and then formed into a 10 mL solution using acetone to serve as a sample solution. This sample solution was analyzed by HPLC-PDA. The sample solution was assayed using dibutylhydroxytoluene by taking the component having a maximum UV absorption wavelength near 280 nm as the phenols.

From Table 1, it is found that 0.47 (Component A)/0.43 (virgin resin)=1.093, from which it can be understood that the content of phenols in Component A increased by about 10% compared with the virgin resin.

Example 1

Component A, a rubber component ("METABLEN C223A", manufactured by Mitsubishi Rayon Co., Ltd.), and a fluoroolefin component ("METABLEN A3800", manufactured by Mitsubishi Rayon Co., Ltd.) were blended. In this example, 29.73 kg (99.1 wt %) of Component A, 0.15 kg (0.50 wt %) of the rubber component, and 0.12 kg (0.40 wt %) of the fluoroolefin component were blended. The mixture was then melt-kneaded and pelletized. The melt-kneading was carried out using "EX-11" manufactured by PLABOR Co., Ltd., with co-rotation at 250 rpm and at a screw temperature of 220° C. The produced pellet was molded into a bar test piece having a thickness of 2.0 mm for the V-test based on the UL 94 standard and a type-1 test piece for a Charpy impact test based on the JIS K7111 standard.

Example 2

Component A, a rubber component ("METABLEN C223A", manufactured by Mitsubishi Rayon Co., Ltd.), and a fluoroolefin component ("METABLEN A3800", manufactured by Mitsubishi Rayon Co., Ltd.) were blended. In this example, 29.67 kg (98.9 wt %) of Component A, 0.21 kg (0.70 wt %) of the rubber component, and 0.12 kg (0.40 wt %) of the fluoroolefin component were blended. The mixture was then melt-kneaded and pelletized. The melt-kneading was carried out using "EX-11" manufactured by PLABOR Co., Ltd., with co-rotation at 250 rpm and at a screw temperature of 220° C. The produced pellet was molded into a bar test piece having a thickness of 2.0 mm for the V-test based on the UL 94 standard and a type-1 test piece for a Charpy impact test based on the JIS K7111 standard.

Example 3

Component A, a rubber component ("METABLEN C223A", manufactured by Mitsubishi Rayon Co., Ltd.), and a fluoroolefin component ("METABLEN A3800", manufactured by Mitsubishi Rayon Co., Ltd.) were blended. In this example, 29.58 kg (98.6 wt %) of Component A, 0.30 kg (1.0 wt %) of the rubber component, and 0.12 kg (0.40 wt %) of the fluoroolefin component were blended. The mixture was then melt-kneaded and pelletized. The melt-kneading was carried out using "EX-11" manufactured by PLABOR Co., Ltd., with co-rotation at 250 rpm and at a screw temperature of 220° C. The produced pellet was molded into a bar test piece having a thickness of 2.0 mm for the V-test based on the UL 94 standard and a type-1 test piece for a Charpy impact test based on the JIS K7111 standard.

Example 4

Component A, a PC/ABS resin of the same kind but having a different color than component A ("CYCOLOY C6600", i.e. black, manufactured by GE Plastics Japan Co., Ltd.), a rubber component ("METABLEN C223A", manufactured by Mitsubishi Rayon Co., Ltd.), and a fluoroolefin component ("METABLEN A3800", manufactured by Mitsubishi Rayon Co., Ltd.) were blended. In this example, 29.36 kg (97.85 wt %) of component A, 0.225 kg (0.75 wt %) of the PC/ABS resin of the same kind but having a different color than component A, 0.30 kg (1.0 wt %) of the rubber component, and 0.12 kg (0.4 wt %) of the fluoroolefin component were blended. The mixture was then melt-kneaded and pelletized. The melt-kneading was carried out using "EX-11" manufactured by PLABOR Co., Ltd., with co-rotation at 250 rpm and at a screw temperature of 220° C. The produced pellet was molded into a bar test piece having a thickness of 2.0 mm for the V-test based on the UL 94 standard and a type-1 test piece for a Charpy impact test based on the JIS K7111 standard.

Example 5

Component A, a rubber component ("METABLEN C223A", manufactured by Mitsubishi Rayon Co., Ltd.), and a fluoroolefin component ("METABLEN A3800", manufactured by Mitsubishi Rayon Co., Ltd.) were blended. In this example, 29.43 kg (98.1 wt %) of component A, 0.45 kg (1.5 wt %) of the rubber component, and 0.12 kg (0.40 wt %) of the fluoroolefin component were blended. The mixture was then melt-kneaded and pelletized. The melt-kneading was carried out using "EX-11" manufactured by PLABOR Co., Ltd., with co-rotation at 250 rpm and at a screw temperature of 220° C. The produced pellet was molded into a bar test piece having a thickness of 2.0 mm for the V-test based on the UL 94 standard and a type-1 test piece for a Charpy impact test based on the JIS K7111 standard.

Comparative Example 1

Component A, a rubber component ("METABLEN C223A", manufactured by Mitsubishi Rayon Co., Ltd.), and a fluoroolefin component ("METABLEN A3800", manufactured by Mitsubishi Rayon Co., Ltd.) were blended. In this example, 28.98 kg (96.6 wt %) of component A, 0.90 kg (3.0 wt %) of the rubber component, and 0.12 kg (0.40 wt %) of the fluoroolefin component were blended. The mixture was then melt-kneaded and pelletized. The melt-kneading was carried out using "EX-11" manufactured by PLABOR Co., Ltd., with co-rotation at 250 rpm and at a screw temperature of 220° C. The produced pellet was molded into a bar test piece having a thickness of 2.0 mm for the V-test based on the UL 94 standard and a type-1 test piece for a Charpy impact test based on the JIS K7111 standard.

Comparative Example 2

Component A and a fluoroolefin component ("METABLEN A3800", manufactured by Mitsubishi Rayon Co., Ltd.) were blended. In this example, 29.88 kg (99.6 wt %) of component A and 0.12 kg (0.40 wt %) of the fluoroolefin component were blended. The mixture was then melt-kneaded and pelletized. The melt-kneading was carried out using "EX-11" manufactured by PLABOR Co., Ltd., with co-rotation at 250 rpm and at a screw temperature of 220° C. The produced pellet was molded into a bar test piece having a thickness of 2.0 mm for the V-test based on the UL 94 standard and a type-1 test piece for a Charpy impact test based on the JIS K7111 standard.

Comparative Example 3

Component A only was directly charged into the hopper of an injection molding machine. Then, a bar test piece having a thickness of 2.0 mm for the V-test based on the UL 94 standard and a type-1 test piece for a Charpy impact test based on the JIS K7111 standard were molded.

Comparative Example 4

Virgin resin (grey) only was directly charged into the hopper of an injection molder. Then, a bar test piece having a thickness of 2.0 mm for a V-test based on the UL 94 standard and a type-1 test piece for a Charpy impact test based on the JIS K7111 standard were molded.

make the impact strength and/or flame retardancy recover to the same level as that of a virgin resin.

TABLE 1

| Resin type | Content of phenols (w/w %) |
|---|---|
| Component A | 0.47 |
| Virgin resin of the same grade as component A | 0.43 |

TABLE 2

| Composition (wt %) | | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|
| Composition (wt %) | Component A | 99.1 | 98.9 | 98.6 | 97.85 | 98.1 | 96.6 | 99.6 | 100 | 0 |
| | Virgin resin (black) | 0 | 0 | 0 | 0.75 | 0 | 0 | 0 | 0 | 0 |
| | Rubber component | 0.50 | 0.70 | 1.0 | 1.0 | 1.5 | 3.0 | 0 | 0 | 0 |
| | Fluoroolefin component | 0.40 | 0.40 | 0.40 | 0.40 | 0.40 | 0.40 | 0.40 | 0 | 0 |
| | Virgin resin (grey) | 0 | 0 | 0 | 0 | 0 | 0 | 0 | 0 | 100 |
| Charpy impact strength/kJ m$^{-2}$ | | 41.6 | 44.2 | 46.3 | 46.2 | 49.3 | 54.4 | 18.5 | 18.5 | 44.9 |
| UL94 V-test | | V-0 | V-0 | V-0 | V-0 | V-0 | V-1 | V-0 | V-2 | V-0 |

The component blend ratios and evaluation results of Examples 1 to 5 and Comparative Examples 1 to 4 are collectively shown in Table 2.

The evaluations shown in Table 2 were carried out under the following conditions.

(1) Impact Strength Evaluation

The molded type-1 test pieces were cut to form a type-A notch according to JIS K7111 for a Charpy impact test. The test pieces were then subjected to a Charpy impact test using an impact testing machine.

(2) Flame Retardancy Evaluation (V Combustion Test)

A V-test according to the UL 94 was carried out on ten samples (five and five samples for normal and aging conditions respectively) of the molded bar test pieces for the V-test, and the corresponding V-test performances were recorded. The determination criteria of the V-test are shown in Table 3.

From the results shown in Table 2, it can be seen that the Charpy impact strength can be recovered to a level equal to or higher than that of a virgin resin even with a blend content of the rubber component of 1 wt %. However, from the results of Example 1 and Comparative Example 1, it can be seen that addition of an excessive amount of the rubber component may cause degradation of the flame retardancy performance. That is, if the rubber component is added in an excess amount, a flame retardancy performance equivalent to that of a virgin resin may not be able to be maintained.

From Table 2, it can generally be seen that the test pieces containing 0.5 wt % or more and 1.5 wt % or less of the rubber component exhibit good strength and flame retardancy results. For example, it can be seen that the strength and flame retardancy performance are provided in compositions having 1.0 wt % and 1.5 wt % of the rubber component. Therefore, the addition of 0.5 wt % or more and 1.5% or less, such as 1.0 wt % or more and 1.5 wt % or less of the rubber component may provide a molded article having improved strength and flame retardancy.

Accordingly, in one aspect, in order to improve the impact strength and flame retardancy performance of a degraded PC/ABS resin, for example to recover to the same level as that of the physical properties of a virgin resin, a suitable rubber component may be blended with the PC/ABS resin so as to

TABLE 3

| | V-0 | V-1 | V-2 |
|---|---|---|---|
| Combustion time after separating each sample from the flame for the first or second time | 10 seconds or less | 30 seconds or less | 30 seconds or less |
| Total combustion time after 10-times separations from the flame | 50 seconds or less | 250 seconds or less | 250 seconds or less |
| Total combustion time and flare-up time after separation from the flame for the second time | 30 seconds or less | 60 seconds or less | 60 seconds or less |
| Ignition of absorbent cotton by the fallen matter | No | No | Yes |

Thus, in one aspect, the present invention provides a process for producing a thermoplastic resin composition (e.g., a molded article), and a thermoplastic resin composition itself, with strength and flame retardancy that are recovered to the same levels as that of a virgin plastic of the same grade, using a thermoplastic resin molded article comprising an alloy resin of polycarbonate and ABS, of which the strength and flame retardancy have been deteriorated due to degradation.

According to another aspect of the present invention, a thermoplastic resin composition, of which the strength and flame retardancy have been recovered to the same level as that of a virgin resin, can be provided by combining a rubber component with a degraded thermoplastic resin comprising an alloy resin of a polycarbonate resin and an ABS resin, followed by kneading and molding the resultant mixture.

As a result, the options for recycling an alloy resin of polycarbonate and ABS may be increased. Also according to aspects of the present invention, a degraded plastic can be reused.

While the present invention has been described with reference to exemplary embodiments, it is to be understood that the invention is not limited to only the exemplary embodiments disclosed herein. The scope of the following claims is thus to be accorded the broadest interpretation so as to encompass all such modifications and equivalent structures and functions.

This application claims the benefit of Japanese Patent Application No. 2007-292192, filed Nov. 9, 2007, and No. 2008-278428, filed Oct. 29, 2008, which are hereby incorporated by reference herein in their entirety.

What is claimed is:

1. A process for producing a thermoplastic resin composition, comprising:
    grinding a degraded thermoplastic resin molded article that comprises an alloy resin of polycarbonate and ABS to form a ground product;
    mixing 0.5 wt % or more and 1.5 wt % or less of rubber component based on 100 wt % of the thermoplastic resin composition and the ground product and 0 wt % or more and 0.5 wt % or less of fluoroolefin based on 100 wt % of thermoplastic resin composition and 1.0 wt % or less of virgin resin based on 100 wt % of the thermoplastic resin composition.

2. The process for producing the thermoplastic resin composition according to claim 1, wherein the rubber component has a core-shell structure, and wherein the rubber component is selected from butadiene rubber, styrene butadiene rubber, or acrylonitrile butadiene rubber.

3. The process for producing the thermoplastic resin composition according to claim 1, wherein the radius of the ground product is from 3 mm or more to 8 mm or less.

4. The process for producing the thermoplastic resin composition according to claim 1, wherein the ground product is of a resin obtained from a used article.

5. A process for producing a molded article, comprising:
    a production step of producing the thermoplastic resin composition as set forth in claim 1; and
    a molding step of molding the thermoplastic resin to produce the molded article.

6. The process for producing the thermoplastic resin composition according to claim 1,
    wherein the virgin resin comprises an alloy resin of polycarbonate and ABS.

7. The process for producing the thermoplastic resin composition according to claim 1,
    wherein a content of phenols in the degraded thermoplastic resin molded article is larger by 5% or more than a content of phenols in the virgin resin.

* * * * *